(12) United States Patent
Chiou

(10) Patent No.: US 8,371,691 B2
(45) Date of Patent: Feb. 12, 2013

(54) AUXILIARY EYEGLASS DEVICE HAVING LENSES DISPOSED BEHIND A PRIMARY EYEGLASS DEVICE

(76) Inventor: Grace Chiou, Tainan County (TW)

( * ) Notice: Subject to any disclaimer, the term of this patent is extended or adjusted under 35 U.S.C. 154(b) by 287 days.

(21) Appl. No.: 12/938,541

(22) Filed: Nov. 3, 2010

(65) Prior Publication Data

US 2011/0109871 A1    May 12, 2011

(30) Foreign Application Priority Data

Nov. 6, 2009  (TW) .............................. 98220586 U

(51) Int. Cl.
*G02C 9/00* (2006.01)

(52) U.S. Cl. ................. 351/47; 351/48; 351/57; 351/58

(58) Field of Classification Search ............ 351/47, 351/48, 57, 58, 41
See application file for complete search history.

(56) References Cited

U.S. PATENT DOCUMENTS

| | | | | | |
|---|---|---|---|---|---|
| 5,412,438 | A | * | 5/1995 | Bolle' | 351/44 |
| 5,790,230 | A | * | 8/1998 | Sved | 351/138 |
| 5,929,963 | A | * | 7/1999 | McNeal | 351/47 |
| 6,206,519 | B1 | * | 3/2001 | Lin | 351/57 |
| 6,290,354 | B1 | * | 9/2001 | Safran | 351/57 |
| 6,386,703 | B1 | * | 5/2002 | Huang | 351/57 |
| 6,502,937 | B2 | * | 1/2003 | Yang | 351/57 |
| 7,204,589 | B2 | * | 4/2007 | Pieterman | 351/47 |
| 7,641,333 | B2 | * | 1/2010 | Blanshay et al. | 351/47 |

* cited by examiner

*Primary Examiner* — Hung Dang
(74) *Attorney, Agent, or Firm* — Reed Smith LLP

(57) ABSTRACT

An auxiliary eyeglass device includes a connecting unit and an auxiliary lens unit. The connecting unit includes an adjustment plate that is at least partly flexible, and an eyeglass-connecting member that is attached to the adjustment plate and that is connected to a primary eyeglass device. The auxiliary lens unit includes a pair of auxiliary lenses that is mounted on the adjustment plate, such that the adjustment plate can be flexed to result in a change in an inclination angle of at least one of the auxiliary lenses relative to the primary eyeglass device.

14 Claims, 6 Drawing Sheets

AUXILIARY EYEGLASS DEVICE HAVING LENSES DISPOSED BEHIND A PRIMARY EYEGLASS DEVICE

CROSS-REFERENCE TO RELATED APPLICATION

This application claims priority of Taiwanese Application No. 098220586, filed on Nov. 6, 2009.

BACKGROUND OF THE INVENTION

1. Field of the Invention

This invention relates to an auxiliary eyeglass device, and more particularly to an auxiliary eyeglass device having lenses disposed behind a primary eyeglass device.

2. Description of the Related Art

In case an auxiliary eyeglass device having flat lenses is used with a primary eyeglass device having a curved lens not designed for the auxiliary eyeglass device, the image would be out of focus. Thus, it is desirable that angles of a pair of lenses of an auxiliary eyeglass device are adjustable relative to a primary eyeglass device having a curved lens.

SUMMARY OF THE INVENTION

The object of this invention is to provide an auxiliary eyeglass device including angle-adjustable lenses.

Accordingly, an auxiliary eyeglass device of this invention includes a connecting unit and an auxiliary lens unit. The connecting unit includes an adjustment plate that is at least partly flexible, and an eyeglass-connecting member that is attached to the adjustment plate and that is connected to a primary eyeglass device. The auxiliary lens unit includes a pair of auxiliary lenses that is mounted on the adjustment plate, such that the adjustment plate can be flexed to result in a change in an inclination angle of at least one of the auxiliary lenses relative to the primary eyeglass device.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
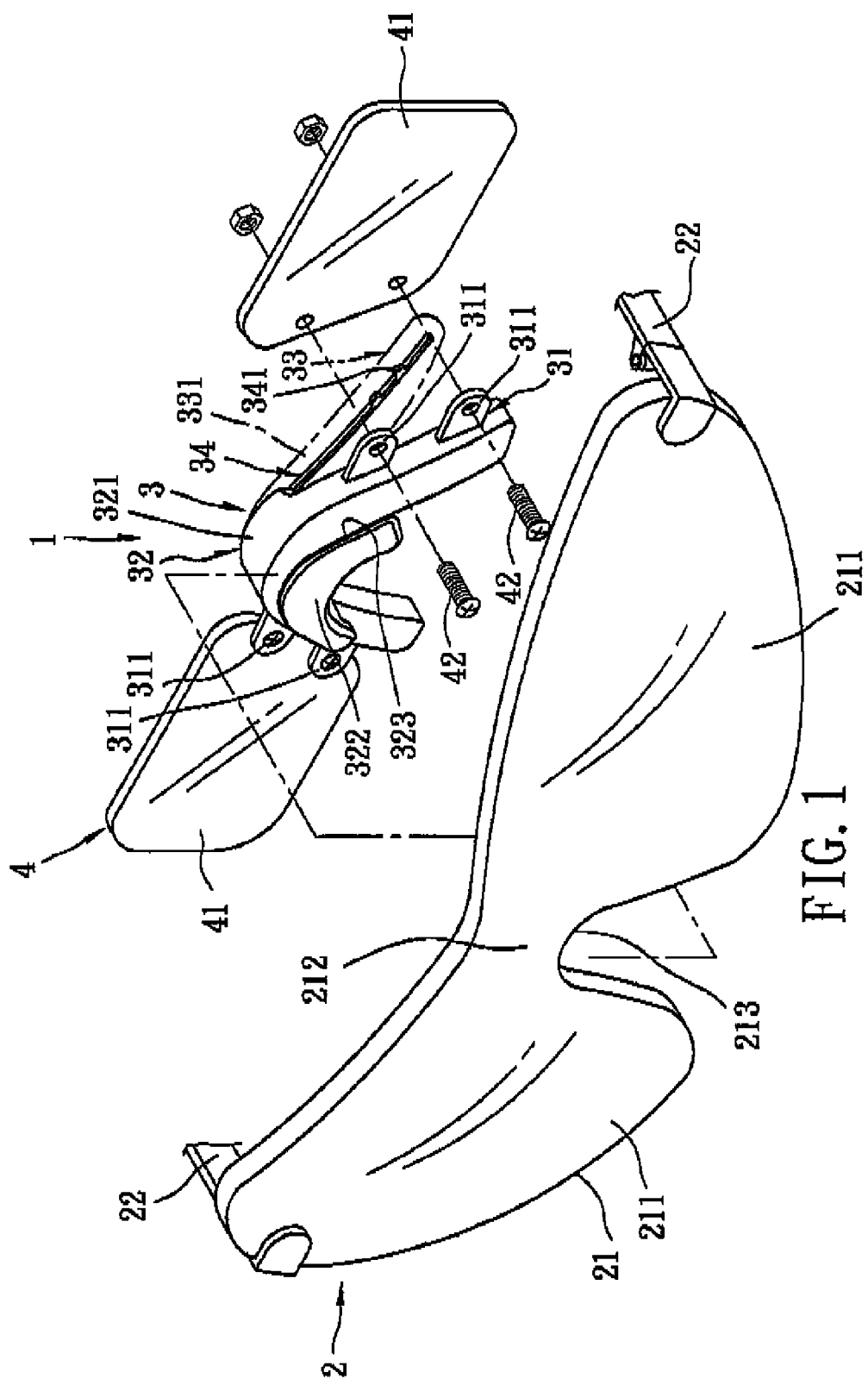
FIG. 1 is an exploded perspective view of the first preferred embodiment of an auxiliary eyeglass device according to this invention, illustrating how the auxiliary eyeglass device is connected to a primary eyeglass device.

Before the present invention is described in greater detail in connection with the preferred embodiments, it should be noted that similar elements and structures are designated by like reference numerals throughout the entire disclosure.

Figure 2:
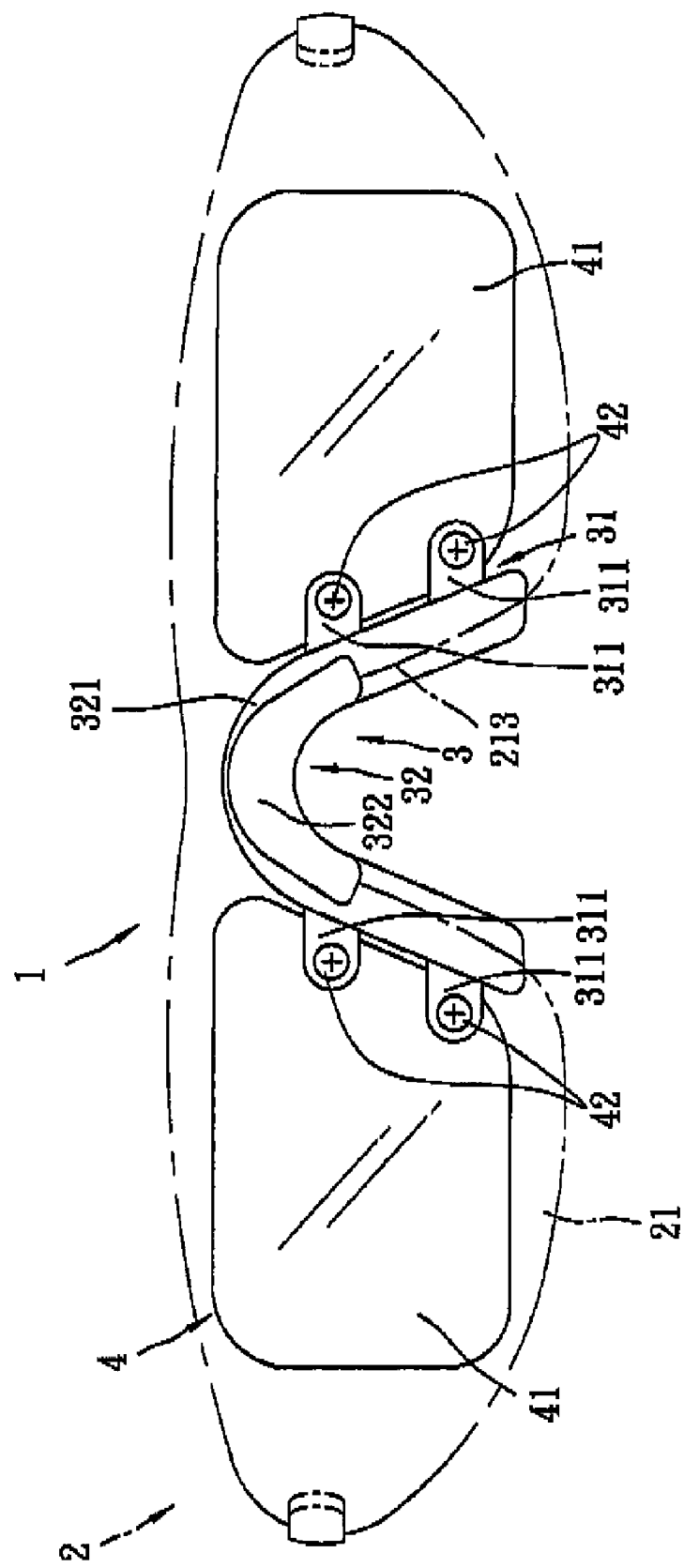
FIG. 2 is a schematic front view of the first preferred embodiment.
Figure 3:
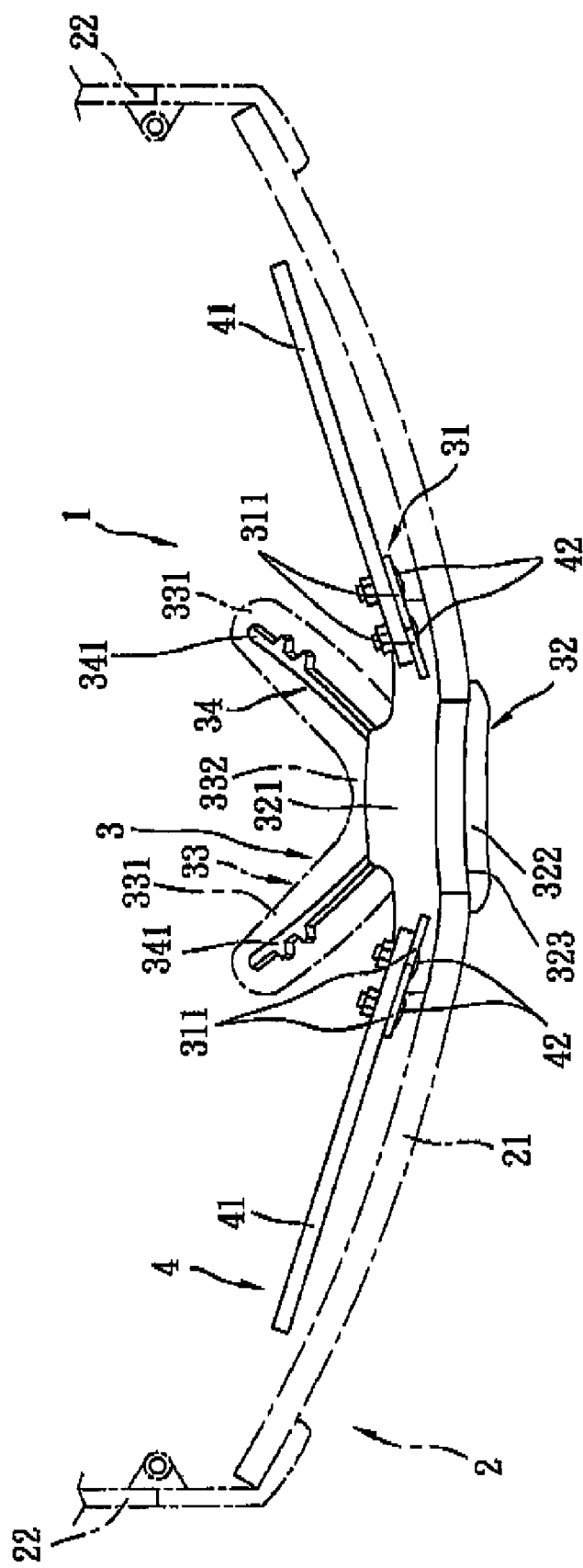
FIG. 3 is a schematic top view of the first preferred embodiment.

Referring to FIGS. 1, 2, and 3, the first preferred embodiment of an auxiliary eyeglass device 1 according to this invention is usable with a primary eyeglass device 2. The primary eyeglass device 2 may be a sunglass or safety eyeglass, which is frameless or framed. In this embodiment, the primary eyeglass device is exemplified using a frameless eyeglass. The primary eyeglass device 2 includes a curved primary lens 21 fitting ergonomically the face of the user, and two temples 22 extending respectively and rearwardly from left and right ends of the primary lens 21. The primary lens 21 includes two primary lens portions 211 and a connecting lens portion 212 connected integrally between the primary lens portions 211. A bottom edge of the connecting lens portion 212 cooperates with inner side edges of the primary lens portions 211 to define a notch 213.

The auxiliary eyeglass device 1 may be nearsighted eyeglasses, sunglasses, or other optical eyeglasses. The auxiliary eyeglass device 1 is mounted removably on the primary eyeglass device 2, and includes a generally inverted V-shaped connecting unit 3, and an auxiliary lens unit 4 mounted to the connecting unit 3.

The connecting unit 3 includes a flexible adjustment plate 31, a flexible connecting rod 34, an eyeglass-connecting member 32 attached to the adjustment plate 31 and connected to the primary eyeglass device 2, and a nosepiece 33 sleeved on the connecting rod 34 and disposed behind the eyeglass-connecting member 32. The adjustment plate 31 is made of a metal material, and includes two aligned pairs of lens-mounting portions 311. Alternatively, the adjustment plate 31 may be made of a plastic material. Each aligned pair of the lens-mounting portions 311 extend respectively from left and right sides of the eyeglass-connecting member 32. In this embodiment, the lens-mounting portions 311 at the same side of the eyeglass-connecting member 32 are spaced apart from each other in a vertical direction. Alternatively, the number of the lens-mounting portions 311 can be changed.

The connecting rod 34 has two connecting rod portions 341. One of the connecting rod portions 341 extends rearwardly, downwardly, and leftwardly from a rear side of the eyeglass-connecting member 32. The other of the connecting rod portions 341 extends rearwardly, downwardly, and rightwardly from the rear side of the eyeglass-connecting member 32.

The eyeglass-connecting member 32 includes a generally inverted V-shaped bridge 321 connected to the adjustment plate 31, and a front supporting portion 322 extending forwardly from a front side of the bridge 321 and subsequently upwardly so as to allow a wall of the primary eyeglass device 2 defining the notch 213 to be clamped between the front supporting portion 322 and the bridge 321, thereby retaining the auxiliary eyeglass device 1 on the primary eyeglass device 2. That is, the front supporting portion 322 cooperates with the bridge 321 to define an inverted V-shaped insert groove 323 for receiving the wall of the primary eyeglass device 2 defining the notch 213. The nosepiece 33 is made of a soft material, such as rubber, and includes two wings 331 sleeved respectively on the connecting rod portions 341, and a middle connecting portion 332 connected between the wings 331. In design, the middle connecting portion 332 may be omitted from the nosepiece 33, and the nosepiece 33 may be formed integrally with the eyeglass-connecting member 32.

The auxiliary lens unit 4 includes a pair of auxiliary lenses 91 spaced apart from each other in a left-to-right direction and mounted on the lens-mounting portions 311 of the adjustment plate 31, and four screw-and-nut units 42 connected respectively to the lens-mounting portions 311 for fastening the auxiliary lenses 41 to the lens-mounting portions 311. The screw-and-nut units 4 can be replaced with any other suitable fasteners.

During assembly, the wall of the primary lens 21 defining the notch 213 is first inserted into the insert groove 323 in the eyeglass-connecting member 32 to allow the auxiliary lens 91 to be disposed behind the primary lens 21. Next, the lens-mounting portions 311 are flexed according to the curvature of the primary lens 21, thereby changing inclination angles of the auxiliary lenses 41 relative to the primary eyeglass device 2.

Figure 4:
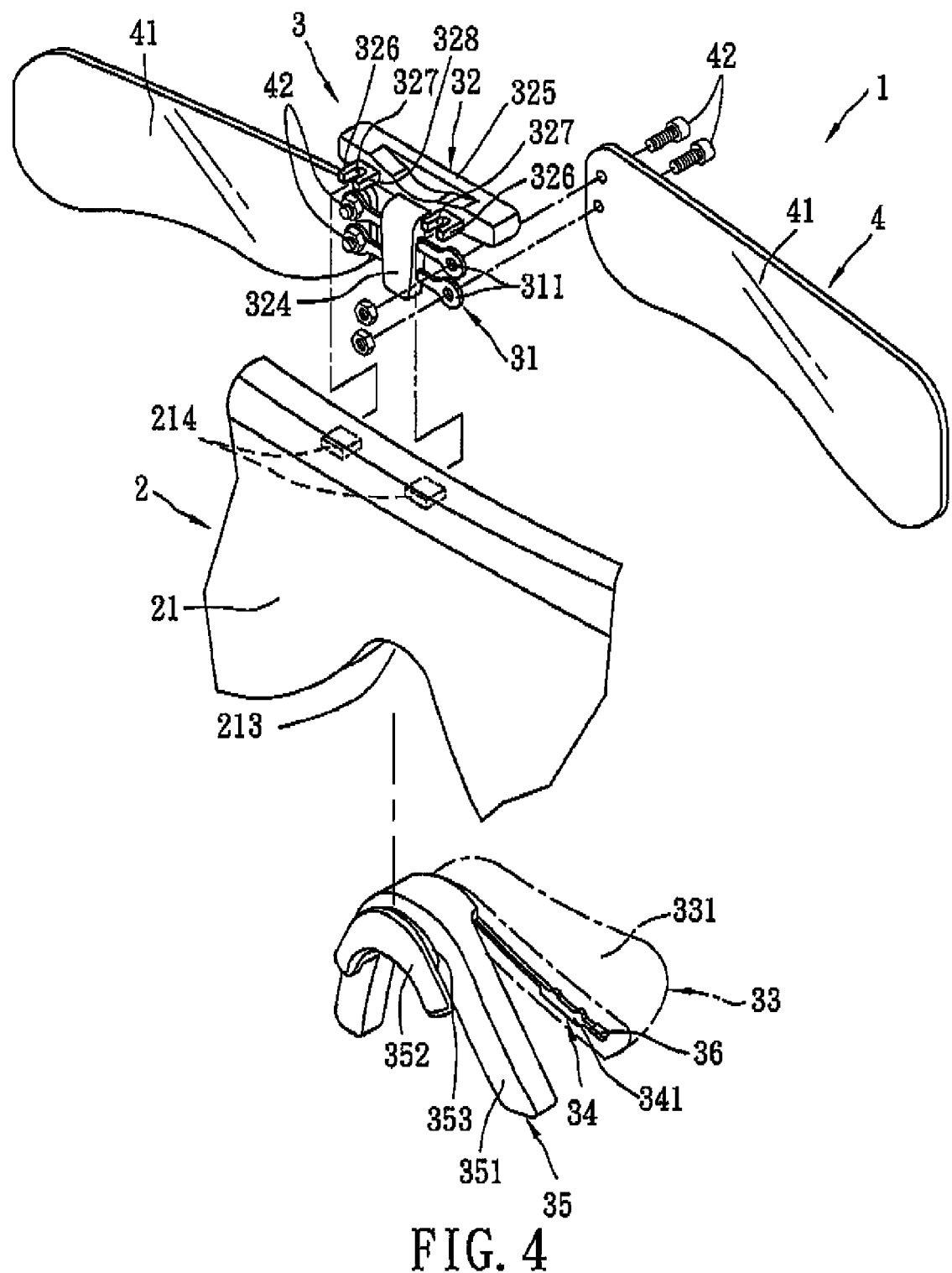
FIG. 4 is an exploded perspective view of the second preferred embodiment of an auxiliary eyeglass device according to this invention, illustrating how the auxiliary eyeglass device is connected to a primary eyeglass device.
Figure 5:
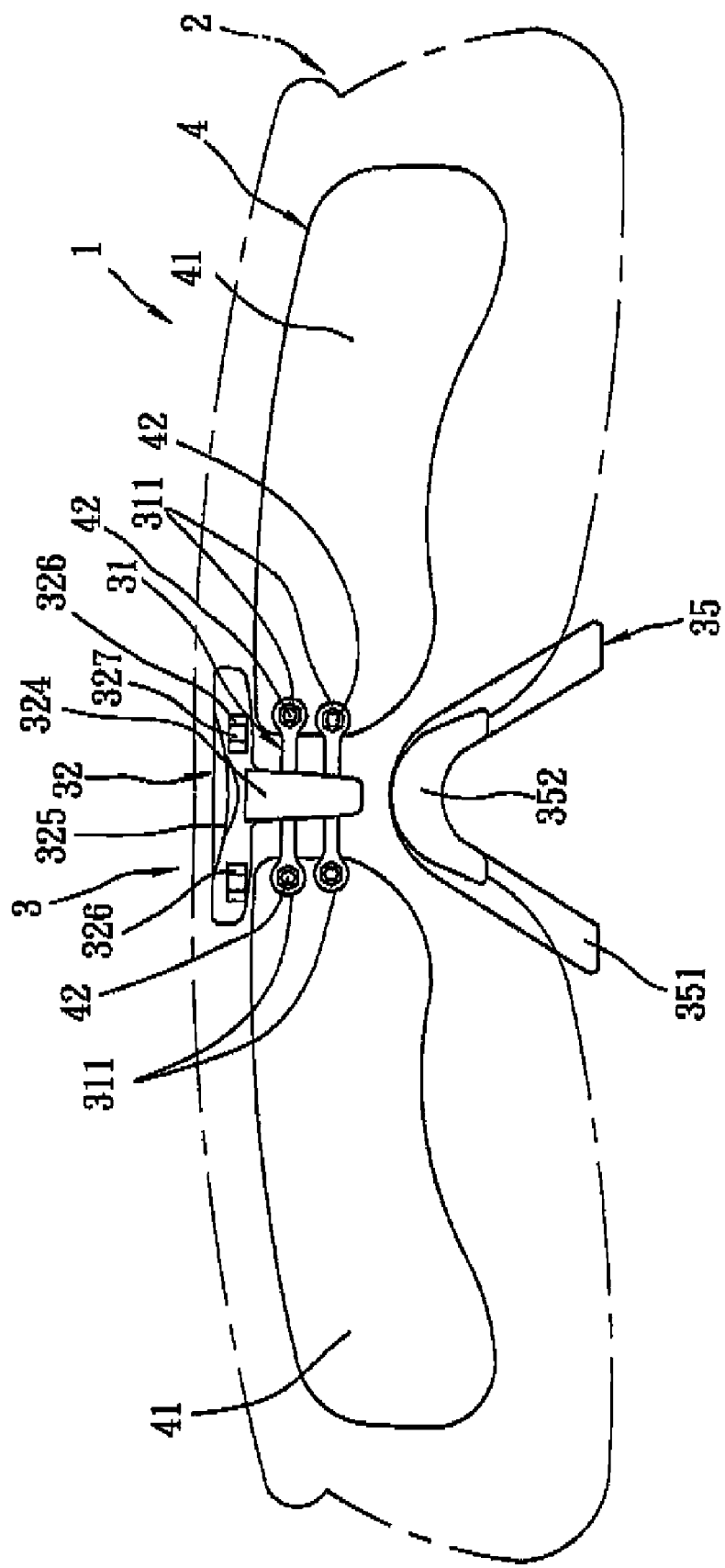
FIG. 5 is a schematic front view of the second preferred embodiment.
Figure 6:
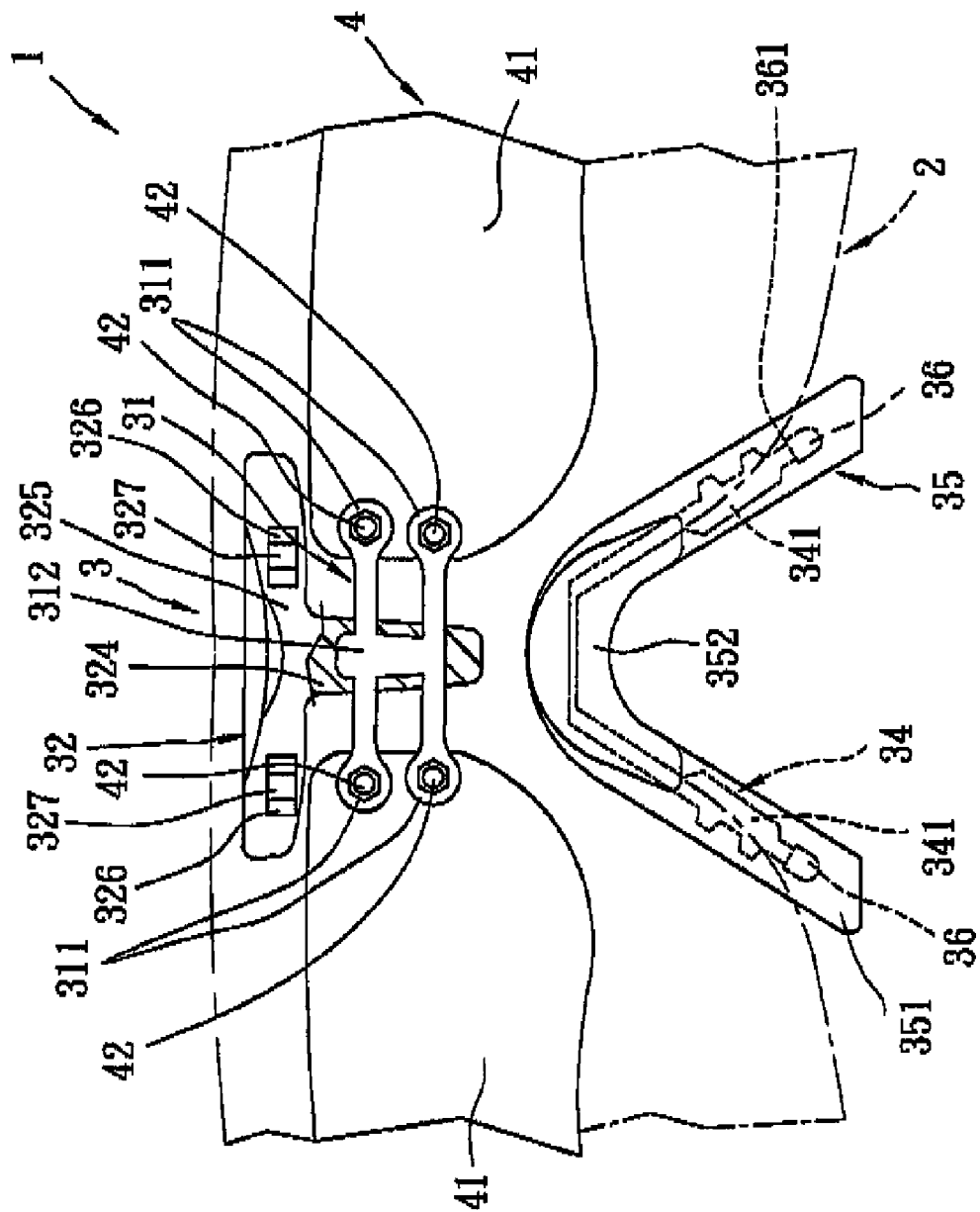
FIG. 6 is a partly sectional schematic view of the second preferred embodiment.

FIGS. 4, 5, and 6 show the second preferred embodiment of an auxiliary eyeglass device 1 according to this invention, which is similar in construction to the first preferred embodiment. Similar to the first preferred embodiment, the primary lens 21 of the primary eyeglass device 2 is formed with a notch 213, and the auxiliary eyeglass device 1 includes a connecting unit 3, and an auxiliary lens unit 4 mounted to the connecting unit 3. Unlike the first preferred embodiment, the primary lens 21 of the primary eyeglass device 2 has a rear surface formed with two recesses 214 disposed at a top portion thereof and spaced apart from each other in the left-to-right direction. The connecting unit 3 also includes a flexible adjustment plate 31, a flexible connecting rod 34, an eyeglass-connecting member 32 connected to the adjustment plate 31, and a nosepiece 33 sleeved on the connecting rod 34. In this embodiment, the connecting unit 3 further includes a connecting seat 35 disposed under the eyeglass-connecting member 32 and the primary lens 21 and connected to the connecting rod 34, and two anti-removal blocks 36. The connecting rod portions 341 and the anti-removal blocks 36 are surrounded by the nosepiece 33. The nosepiece 33 is disposed behind the connecting seat 35. The anti-removal blocks 36 are connected respectively and fixedly to two opposite ends of the connecting rod 39 to define two shoulders 361 each disposed between the connecting rod 34 and the corresponding anti-removal block 36 for preventing removal of the nosepiece 33 from the connecting rod 34.

In this embodiment, the adjustment plate 31 further includes an upright straight connecting portion 312 disposed at a middle portion thereof. The lens-mounting portions 311 extend horizontally and integrally from the connecting portion 312. The eyeglass-connecting member 32 includes an upright portion 324 connected to the connecting portion 312, an elongated horizontal mounting portion 325 having a middle portion connected integrally to and disposed above the upright portion 324, and two connecting extension portions 326 extending forwardly and integrally from the mounting portion 325, spaced apart from each other in the left-and-right direction, and disposed in front of the upright portion 324. The connecting extension portions 326 are press fitted within the recesses 214 in the primary lens 41, respectively. Each of the connecting extension portions 326 has a slot 327 to define two resilient arms 328 (see FIG. 4) so as to facilitate insertion of the connecting extension portions 326 into the recesses 214 in the primary lens 21 during assembly of the auxiliary eyeglass device 1 to the primary eyeglass device 2. In an alternative embodiment, the eyeglass-connecting member 32 may include only one connecting extension portion 326, and the primary lens 21 may include only one recess 214.

In this embodiment, the connecting seat 35 includes a generally inverted V-shaped bridge 351, and a front supporting portion 352 extending forwardly from a front side of the bridge 351 and subsequently upwardly to define an insert groove 353, so that the wall of the primary lens 41 is clamped between the bridge 351 and the front supporting portion 352.

Each of the wings 331 of the nosepiece 33 is sleeved on the corresponding connecting rod portion 341 and the corresponding anti-removal block 36.

Due to inclusion of the adjustment plate 31 in the auxiliary eyeglass device 1, the auxiliary eyeglass device 1 is operable to adjust the inclination angles of the auxiliary lens 41 relative to the primary eyeglass device 2 to prevent the image from being out of focus. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. An auxiliary eyeglass device comprising:
a connecting unit including an adjustment plate that is at least partly flexible, and an eyeglass-connecting member that is attached to said adjustment plate and that is adapted to be connected to a primary eyeglass device; and
an auxiliary lens unit including a pair of auxiliary lenses that is mounted on said adjustment plate such that said adjustment plate can be flexed to result in a change in an inclination angle of at least one of said auxiliary lenses relative to the primary eyeglass device.

2. The auxiliary eyeglass device as claimed in claim 1, wherein said adjustment plate includes a plurality of lens-mounting portions extending from left and right sides thereof and permitting said auxiliary lenses to be mounted thereon.

3. The auxiliary eyeglass device as claimed in claim 2, wherein said auxiliary lens unit further includes a plurality of screw-and-nut units connected respectively to said lens-mounting portions for fastening said auxiliary lenses to said lens-mounting portions.

4. The auxiliary eyeglass device as claimed in claim 2, wherein said adjustment plate includes two aligned pairs of said lens-mounting portions, each aligned pair of said lens-mounting portions extending respectively from the left and right sides of said eyeglass-connecting member, said lens-mounting portions at the same side of said adjustment plate being spaced apart from each other in a vertical direction.

5. The auxiliary eyeglass device as claimed in claim 1, wherein said eyeglass-connecting member includes a generally inverted V-shaped bridge, and a front supporting portion extending forwardly from a front side of said bridge and subsequently upwardly and adapted for clamping the primary eyeglass device between said front supporting portion and said bridge.

6. The auxiliary eyeglass device as claimed in claim 1, wherein said connecting unit further includes a flexible connecting rod having two connecting rod portions, one of said connecting rod portions extending rearwardly, downwardly, and leftwardly from a rear side of said eyeglass-connecting member, the other of said connecting rod portions extending rearwardly, downwardly, and rightwardly from the rear side of said eyeglass-connecting member, said connecting unit further including a nosepiece sleeved on said connecting rod portions and made of a soft material.

7. The auxiliary eyeglass device as claimed in claim 6, wherein said nosepiece includes two wings sleeved respectively on said connecting rod portions, and a middle connecting portion connected between said wings.

8. The auxiliary eyeglass device as claimed in claim 1, the primary eyeglass device having a rear surface formed with a recess, wherein said adjustment plate includes an upright straight connecting portion disposed at a middle portion thereof, and a plurality of aligned pairs of lens-mounting portions, each pair of said lens-mounting portions extending respectively and integrally from said connecting portion away from each other, said eyeglass-connecting member including an upright portion connected to said connecting portion, and a connecting extension portion disposed in front of said upright portion and adapted to be press fitted within the recess in the primary eyeglass device.

9. The auxiliary eyeglass device as claimed in claim 8, wherein said eyeglass-connecting member further includes an elongated mounting portion connected integrally to and disposed above said upright portion, said connecting extension portion extending forwardly and integrally from said mounting portion.

10. The auxiliary eyeglass device as claimed in claim 8, wherein said connecting extension portion has at least one slot to define at least resilient arm so as to facilitate insertion of said connecting extension portion into the recess in the primary eyeglass device during assembly of said auxiliary eyeglass device to the primary eyeglass device.

11. The auxiliary eyeglass device as claimed in claim 1, wherein said connecting unit further includes a connecting seat disposed under said eyeglass-connecting member and adapted to be connected to and disposed under the primary eyeglass device, and a flexible connecting rod connected to said connecting seat.

12. The auxiliary eyeglass device as claimed in claim 11, wherein said connecting seat includes a generally inverted V-shaped bridge, and a front supporting portion extending forwardly from a front side of said bridge and subsequently upwardly and adapted for clamping the primary eyeglass device between said front supporting portion and said bridge.

13. The auxiliary eyeglass device as claimed in claim 11, wherein said connecting rod includes two connecting rod portions, one of said connecting rod portions extending rearwardly, downwardly, and leftwardly from said connecting seat, the other of said connecting rod portions extending rearwardly, downwardly, and rightwardly from said connecting seat, said connecting unit further including two anti-removal blocks and a soft nosepiece, said connecting rod portions and said anti-removal blocks being surrounded by said nosepiece, said anti-removal blocks being connected respectively and fixedly to two opposite ends of said connecting rod to define two shoulders each disposed between said connecting rod and a respective one of said anti-removal blocks for preventing removal of said nosepiece from said connecting rod.

14. The auxiliary eyeglass device as claimed in claim 13, wherein said nosepiece includes two wings sleeved respectively on said connecting rod portions, and a middle connecting portion connected between said wings.

* * * * *